United States Patent
Metral et al.

(10) Patent No.: US 9,340,702 B2
(45) Date of Patent: *May 17, 2016

(54) COATING COMPOSITIONS

(71) Applicant: Blue Cube IP LLC, Midland, MI (US)

(72) Inventors: Guillaume Metral, Frankfurt (DE); Bernd Hoevel, Sinzheim (DE); Joseph Gan, Strasbourg (FR); Michael J. Mullins, Houston, TX (US); Robert E. Hefner, Jr., Rosharon, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,907

(22) Filed: Dec. 15, 2014

(65) Prior Publication Data

US 2015/0099831 A1 Apr. 9, 2015

Related U.S. Application Data

(63) Continuation of application No. 13/512,657, filed as application No. PCT/US2010/056105 on Nov. 10, 2010, now Pat. No. 8,937,114.

(60) Provisional application No. 61/265,806, filed on Dec. 2, 2009.

(51) Int. Cl.

| | |
|---|---|
| C08G 59/24 | (2006.01) |
| C08L 63/00 | (2006.01) |
| C08L 63/02 | (2006.01) |
| C09D 5/03 | (2006.01) |
| C09D 163/00 | (2006.01) |
| C09D 163/02 | (2006.01) |
| C09D 125/04 | (2006.01) |
| C09D 133/00 | (2006.01) |
| C09D 161/04 | (2006.01) |
| C09D 167/00 | (2006.01) |
| C09D 175/04 | (2006.01) |

(52) U.S. Cl.
CPC ............... *C09D 163/00* (2013.01); *C08L 63/00* (2013.01); *C09D 5/03* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,129,488 A * | 12/1978 | McGinniss | ................. 525/438 |
| 4,438,241 A | 3/1984 | Mark et al. | |
| 4,638,027 A | 1/1987 | Mark et al. | |
| 5,126,428 A | 6/1992 | Freitag et al. | |
| 5,308,895 A * | 5/1994 | Gan et al. | ................. 523/445 |
| 5,376,453 A | 12/1994 | Von Guentzkow et al. | |
| 5,401,814 A | 3/1995 | Schomaker et al. | |
| 5,698,600 A | 12/1997 | Wulff et al. | |
| 6,063,876 A | 5/2000 | Hayakawa et al. | |
| 6,403,220 B1 | 6/2002 | Brennan | |
| 6,613,839 B1 | 9/2003 | Gan et al. | |
| 7,582,706 B2 | 9/2009 | Groppel | |
| 2002/0119317 A1 | 8/2002 | Gan et al. | |
| 2003/0170568 A1* | 9/2003 | Misev et al. | ............... 430/281.1 |
| 2005/0261398 A1* | 11/2005 | Koeniger et al. | ............. 523/461 |
| 2007/0221890 A1 | 9/2007 | Gan | |
| 2010/0310849 A1 | 12/2010 | Kress et al. | |
| 2012/0238668 A1 | 9/2012 | Metral et al. | |
| 2012/0238709 A1 | 9/2012 | Metral et al. | |

FOREIGN PATENT DOCUMENTS

| | | |
|---|---|---|
| CN | 1171219 | 5/2005 |
| CN | 101519492 | 9/2009 |
| GB | 1409835 | 10/1975 |
| JP | 2006259249 A * | 9/2006 |
| WO | 9900451 | 1/1999 |
| WO | 2005092826 | 10/2005 |
| WO | 2005118604 | 12/2005 |

OTHER PUBLICATIONS

Machine translation of JP 2006259249 A.*
Ullman's Encyclopedia of Industrial Chemistry, 5th Edition, vol. A9, "Dithiocarbamic Acid to Ethanol," 1987, pp. 547-563.

* cited by examiner

*Primary Examiner* — Mark Kaucher
*Assistant Examiner* — Kregg Brooks
(74) *Attorney, Agent, or Firm* — Polsinelli PC

(57) ABSTRACT

A curable resin composition including (I) at least one thermoset resin composition; and (II) at least one hardener; wherein the powder coating has a balance of properties including a combination of high glass transition temperature and low water absorption.

12 Claims, No Drawings

COATING COMPOSITIONS

CROSS REFERENCE STATEMENT

This application is a Continuation Application of U.S. National Stage application Ser. No. 13/512,657, filed May 30, 2012 and published as US 2012-0238668 on Sep. 20, 2012, which claims benefit to International Application Number PCT/US2010/056105, filed Nov. 10, 2010 and published as WO 2011/068645 on Jun. 9, 2011, which claims priority to U.S. Provisional Application 61/265,806 filed Dec. 2, 2009, the entire contents of which are incorporated herein by reference in its entirety.

BACKGROUND OF THE INVENTION

1. Field of the Invention

The present invention relates to thermosettable coating compositions, and more specifically, the present invention relates to thermosettable compositions for powder coatings and the powder coatings made from the thermosettable compositions.

2. Description of Background and Related Art

Thermoset resins, such as epoxy resins (epoxies), having good thermal resistant properties, are desirable for many applications such as liquid coatings, powder coatings, and castings. Glycidyl ethers of aromatic diphenols are a class of epoxy resins that are commonly used, and there are many that are commercially available. Three desirable properties for these aryl glycidyl ethers are high glass transition temperature (Tg greater than 190° C. by dynamic mechanical thermal analysis with dicyandiamide cure), low monomer viscosity (less than 200 mPa-s at 150° C.), and high epoxy equivalent weight (EEW). Epoxies of the present invention exhibit viscosities as low as 120 mPa-s and the dicyandiamide-cured thermosets have Tgs up to 202° C. and EEWs of greater than 190 grams/equivalent (g/eq).

High Tgs are needed for applications where the coating will be exposed to high temperature, for example to coat steel pipe used for transporting hot oil. The properties of the coating degrade precipitously above the temperature of the Tg. Low viscosity resins make it easier to prepare smooth coatings that are free from defects, such as pinholes. Also, adhesion usually is better for low viscosity coatings because wetting of the complex microstructure of the substrate is better. Finally, epoxy resins with high EEWs give thermosets with a relatively low concentration of hydroxyls in the backbone. Hydroxyls are formed during typically curing reactions of epoxy resins, such as with dicyandiamide, a multifunctional amine. There is a direct relationship between hydroxyl concentration in a thermoset and water absorption. High water absorption is undesirable in coatings because corrosion rates are typically higher and longevity in wet or humid environments suffers.

There are many aryl glycidyl ethers that achieve these properties individually, but not that meet them all properties simultaneously. This balance of properties is difficult to achieve. For example, one common strategy for high Tg is to use polyglycidyl ethers of highly functional polyphenols, especially phenol formaldehyde novolacs which are known as epoxy novolacs. However, examples of such novolacs having viscosities of less than about 200 mPa-s are not capable of achieving high Tgs. For example, D.E.N.™ 438 (trademark of The Dow Chemical Company), an industry standard epoxy novolac, has a viscosity of <200 mPa-s but the Tg of the dicyandiamide-cured thermoset is only 173° C.

Accordingly, there is still a need in the coating industry to develop new thermoset resins useful for coatings that are derived from difunctional resins with a balance of properties including high Tg (>190° C.), low monomer viscosity (<150 mPa-s at 150° C.) and high EEW (>190 g/eq).

SUMMARY OF THE INVENTION

The present invention provides a solution to the problems of the coating industry. The present invention is directed to a curable resin composition for coatings comprising (I) at least one thermoset resin composition; and (II) at least one curing agent. This composition can optionally include catalysts, co-catalysts, additional thermoset resins different from component (I), fillers, pigments, flow aids, and other modifiers; wherein the coatings are derived from an epoxy resin that exhibits a balance of desirable properties including a combination of high glass transition temperature (>190° C. when cured with dicyandiamide), low monomer viscosity (<150 mPa-s at 150° C.) and high EEW (>190 g/eq).

Another embodiment of the present invention is directed to a process for making the above curable composition.

Yet another aspect of the present invention is directed to powder coatings, i.e., thermoset products (cured resin products) made from the above curable resin composition.

DETAILED DESCRIPTION OF THE INVENTION

According to the present invention, a curable resin composition (also referred to herein as a thermosettable composition or hardenable composition), useful for powder coatings of the present invention disclosed herein, may comprise (I) at least one thermoset resin composition; and (II) at least one curing agent. This composition can optionally include catalysts, co-catalysts, additional thermoset resins different from component (I), fillers, pigments, flow aids, and other modifiers; wherein the coating has a combination of high glass transition temperature and low water absorption.

The term "curable" means that the composition is capable of being subjected to conditions which will render the composition to a cured or thermoset state or condition.

The term "cured" or "thermoset" is defined by L. R. Whittington in Whittington's Dictionary of Plastics (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

As non-limiting embodiments of the present invention, the thermoset resin composition, component (I), of the thermosettable composition of the present invention may be selected, for example, from the following:

(1) An epoxy resin represented by Formula I which is prepared from a dihydroxydiphenyl-cycloalkane compound:

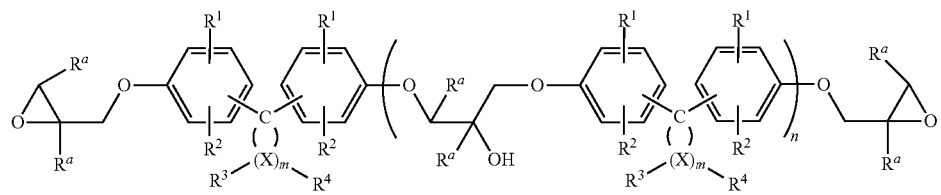

Formula I wherein $R^a$ is a hydrogen or methyl group; $R^1$ and $R^2$, independently from each other, each represents a hydrogen atom, a halogen, a substituted or unsubstituted alkyl group, a substituted or unsubstituted aryl group, or a substituted or unsubstituted aralkyl group; a nitrile group; a nitro group; a substituted or unsubstituted alkoxy group; X is $CH_2$, $CH(R^3)$, or $C(R^3)(R^4)$; m is an integral number between 8 and 20; $R^3$ and $R^4$, independently from each other, each represents a hydrogen atom, a halogen, a substituted or unsubstituted alkyl group, a substituted or unsubstituted aryl group, or a substituted or unsubstituted aralkyl group; and n is an integer having a value from 0 to about 10.

In the Formula I above, the substituted or unsubstituted alkyl group, a substituted or unsubstituted aryl group, or a substituted or unsubstituted aralkyl group for $R^1$-$R^4$ and the substituted or unsubstituted alkoxy group for $R^1$ and $R^2$ may include, for example, a $C_1$-$C_8$ alkyl or alkyloxy group, a $C_6$-$C_{10}$ aryl group, or a $C_7$-$C_{12}$ aralkyl group.

As typically prepared the epoxy resins of Formula I are a mixture of oligomers with varying "n" that can be adjusted depending on the process conditions. When low melt viscosity is desired, conditions are chosen to give a mixture in which the shortest member with n=0 predominates (>70 wt %).

(2) An advanced epoxy resin composition represented in Formula II, such those which are prepared by reacting one or more bisphenols with a stoichiometric excess of one or more of the epoxy resins of Formula I:

stituted di or polycycloalkenyl, or an unsubstituted or substituted aromatic ring. By "hydrocarbyl moiety" used herein it is meant a monovalent radical, more specifically, any monovalent moiety selected from the group consisting of an unsubstituted or substituted alkyl, an unsubstituted or substituted cycloalkyl, an unsubstituted or substituted polycycloalkyl, an unsubstituted or substituted alkenyl, an unsubstituted or substituted cycloalkenyl, an unsubstituted or substituted di or polycycloalkenyl, or an unsubstituted or substituted aromatic ring.

The epoxy resin of Formula II is an advanced epoxy resin product prepared from (a) one or more epoxy resins of a dihydroxydiphenyl-cycloalkane compound given in Formula I with (b) one or more suitable compounds having an average of more than one reactive hydrogen atom per molecule, wherein the reactive hydrogen atom is reactive with an epoxide group in said epoxy resin. The epoxy resin used in the advancement reaction may additionally include (c) any one or more epoxy resins known in the art different from component (a), such as, for example, diglycidyl ethers of dihydroxyaromatic compounds. The preparation of the aforementioned advanced epoxy resin products can be performed using known methods.

Examples of the compound having an average of more than one reactive hydrogen atom per molecule include dihydroxyaromatic, dithiol, disulfonamide, diamide or dicarboxylic acid compounds or compounds containing one primary amine or amide group, two secondary amine groups, one secondary amine group and one phenolic hydroxy group, Formula II

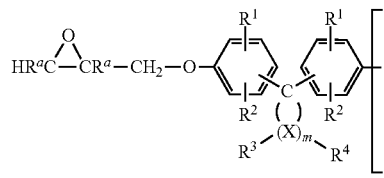

wherein $R^1$, $R^2$, $R^3$, $R^4$, $R^a$, X, and m are as defined in Formula I, y is an integer having a value from 1 to about 20; p is an integer having a value of 1 to about 20; Q is a hydrocarbylene moiety, and each Z is independently selected from the group consisting of O, S, —$NR^b$, wherein $R^b$ is a hydrocarbyl moiety.

By "hydrocarbylene moiety" as used herein it is meant any divalent radical formed by removing two hydrogen atoms from a hydrocarbon. More specifically the hydrocarbylene moiety is a divalent moiety selected from the group consisting of an unsubstituted or substituted alkyl, an unsubstituted or substituted cycloalkyl, an unsubstituted or substituted polycycloalkyl, an unsubstituted or substituted alkenyl, an unsubstituted or substituted cycloalkenyl, an unsubstituted or subone secondary amine group and one carboxylic acid group, or one phenolic hydroxy group and one carboxylic acid group, and any combination thereof.

The ratio of the compound having an average of more than one reactive hydrogen atom per molecule to the epoxy resin is generally from about 0.01:1 to about 0.95:1, preferably from about 0.05:1 to about 0.8:1, and more preferably from about 0.10:1 to about 0.5:1 equivalents of the reactive hydrogen atom per equivalent of the epoxide group in the epoxy resin.

The advancement reaction may be conducted in the presence or absence of a solvent with the application of heat and mixing. The advancement reaction may be conducted at atmospheric, superatmospheric or subatmospheric pressures and at temperatures of from about 20° C. to about 260° C., preferably, from about 80° C. to about 240° C., and more preferably from about 100° C. to about 200° C.

The time required to complete the advancement reaction depends upon factors such as the temperature employed, the chemical structure of the compound having more than one reactive hydrogen atom per molecule employed, and the chemical structure of the epoxy resin employed. Higher temperature may require shorter reaction time whereas lower temperature may require a longer period of the reaction time.

In general, the time for the advancement reaction completion may range from about 5 minutes to about 24 hours, preferably from about 30 minutes to about 8 hours, and more preferably from about 30 minutes to about 4 hours.

A catalyst may also be added in the advancement reaction. Examples of the catalyst may include phosphines, quaternary ammonium compounds, phosphonium compounds, tertiary amines, and mixtures thereof. The catalyst may be employed in quantities from about 0.01 to about 3, preferably from about 0.03 to about 1.5, and more preferably from about 0.05 to about 1.5 percent by weight based upon the total weight of the epoxy resin.

Other details concerning an advancement reaction useful in preparing the advanced epoxy resin product for the resin compound which may be employed in the present invention are given in U.S. Pat. No. 5,736,620 and Handbook of Epoxy Resins by Henry Lee and Kris Neville, incorporated herein by reference.

Examples of the aromatic di and polyhydroxyl containing compound include the dihydroxydiphenyl-cycloalkanes derived from the reaction with of cyclooctanone, cyclodecanone, cyclododecanone, cyclopentadecanone, cyclooctadecanone, cycloeicosanone, and mixtures thereof with phenol; hydroquinone; resorcinol; catechol; 2,4-dimethylresorcinol; 4-chlororesorcinol; tetramethylhydroquinone; bisphenol A (4,4'-isopropylidenediphenol); 4,4'-dihydroxydiphenylmethane; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1-bis(4-hydroxyphenyl)-1-phenylethane; 4,4'-bis(4(4-hydroxyphenoxy)-phenylsulfone)diphenyl ether; 4,4'-dihydroxydiphenyl disulfide; 3,3',3,5'-tetrachloro-4,4'-isopropylidenediphenol; 3,3',3,5'-tetrabromo-4,4'-isopropylidenediphenol; 3,3'-dimethoxy-4,4'-isopropylidenediphenol; 4,4'-dihydroxybiphenyl; 4,4'-dihydroxy-alpha-methylstilbene; 4,4'-dihydroxybenzanilide; bis(4-hydroxyphenyl)terephthalate; N,N'-bis(4-hydroxyphenyl)terephthalamide; bis(4'-hydroxybiphenyl)terephthalate; 4,4'-dihydroxyphenylbenzoate; bis(4'-hydroxyphenyl)-1,4-benzenediimine; 1,1'-bis(4-hydroxyphenyl)cyclohexane; phloroglucinol; pyrogallol; 2,2',5,5'-tetrahydroxydiphenylsulfone; tris(hydroxyphenyl)methane; dicyclopentadiene diphenol; tricyclopentadienediphenol; and any combination thereof.

Examples of the di- and polycarboxylic acids include 4,4'-dicarboxydiphenyl-methane; terephthalic acid; isophthalic acid; 1,4-cyclohexanedicarboxylic acid; 1,6-hexanedicarboxylic acid; 1,4-butanedicarboxylic acid; dicyclopentadienedicarboxylic acid; tris(carboxyphenyl)methane; 1,1-bis(4-carboxyphenyl)cyclohexane; 3,3',5,5'-tetramethyl-4,4'-dicarboxydiphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; 4,4'-benzanilidedicarboxylic acid; 4,4'-phenyl-benzoatedicarboxylic acid; 4,4'-stilbenedicarboxylic acid; and any combination thereof.

Examples of the di- and polymercaptans include 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethylether; 1,2-dimercaptopropane; bis(2-mercaptoethyl) sulfide; tris (mercaptophenyl)methane; 1,1-bis(4-mercaptophenyl) cyclohexane; and any combination thereof.

Examples of the di- and polyamines include 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl) cyclohexane; tris(aminophenyl)methane; 1,4-cyclohexanediamine; 1,6-hexanediamine; piperazine; ethylenediamine; diethylenetriamine; triethylenetetramine; tetraethylenepentamine; 1-(2-aminoethyl)piperazine; bis (aminopropyl)ether; bis(amino-propyl)sulfide; bis(aminomethyl)norbornane; 2,2'-bis(4-aminocyclohexyl)propane; and any combination thereof.

Examples of the primary monoamines include aniline, 4-chloroaniline, 4-methylaniline, 4-methoxyaniline, 4-cyanoaniline, 4-aminodiphenyl oxide, 4-aminodiphenylmethane, 4-aminodiphenyl sulfide, 4-aminobenzophenone, 4-aminodiphenyl, 4-aminostilbene, 4-amino-alpha-methylstilbene, methylamine, 4-amino-4'-nitrostilbene, n-hexylamine, cyclohexylamine, aminonorbornane, 2,6-dimethylaniline, and any combination thereof.

Examples of the sulfonamides include phenylsulfonamide, 4-methoxyphenyl-sulfonamide, 4-chlorophenylsulfonamide, 4-bromophenylsulfonamide, 4-methyl-sulfonamide, 4-cyanosulfonamide, 4-sulfonamidodiphenyl oxide, 4-sulfonamido-diphenylmethane, 4-sulfonamidobenzophenone, 4-sulfonylamidodiphenyl, 4-sulfon-amidostilbene, 4-sulfonamido-alpha-methylstilbene, 2,6-dimethyphenylsulfonamide and any combination thereof.

Examples of the aminophenols include o-aminophenol, m-aminophenol, p-aminophenol, 2-methoxy-4-hydroxyaniline, 3-cyclohexyl-4-hydroxyaniline, 2,6-dibromo-4-hydroxyaniline, 5-butyl-4-hydroxyaniline, 3-phenyl-4-hydroxyaniline, 4-(1-(3-aminophenyl)-1-methylethyl)phenol, 4-(1-(4-aminophenyl)ethyl)phenol, 4-(4-aminophenoxyl) phenol, 4-((4-aminophenyl)thio)phenol, (4-aminophenyl)(4-hydroxy-phenyl)methanone, 4-((4-aminophenyl) sulfonyl) phenol, 4-(1-(4-amino-3,5-dibromophenyl)-1-methylethyl)-2,6-dibromophenol, N-methyl-p-aminophenol, 4-amino-4'-hydroxy-alpha-methylstilbene, 4-hydroxy-4'-amino-alpha-methylstilbene, 3,5-dimethyl-4-hydroxyaniline, and any combination thereof.

Examples of the aminocarboxylic acids include 2-aminobenzoic acid, 3-aminobenzoic acid, 4-aminobenzoic acid, 2-methoxy-4-aminobenzoic acid, 3-cyclohexyl-4-aminobenzoic acid, 2,6-dibromo-4-aminobenzoic acid, 5-butyl-4-aminobenzoic acid, 3-phenyl-4-aminobenzoic acid, 4-(1-(3-aminophenyl)-1-methylethyl)benzoic acid, 4-(1-(4-aminophenyl)ethyl)benzoic acid, 4-(4-aminophenoxyl) benzoic acid, 4-((4-aminophenyl)thio)benzoic acid, (4-aminophenyl)(4-carboxyphenyl)methanone, 4-((4-aminophenyl) sulfonyl)benzoic acid, 4-(1-(4-amino-3,5-dibromophenyl)-1-methylethyl)-2,6-dibromobenzoic acid, N-methyl-4-aminobenzoic acid, 4-amino-4'-carboxy-alpha-methylstilbene, 4-carboxy-4'-amino-alpha-methylstilbene, glycine, N-methylglycine, 4-aminocyclohexanecarboxylic acid, 4-aminohexanoic acid, 4-piperidinecarboxylic acid, 5-aminophthalic acid, 3,5-dimethyl-4-aminobenzoic acid, and any combination thereof.

Examples of the sulfanilamides include o-sulfanilamide, m-sulfanilamide, p-sulfanilamide, 2-methoxy-4-aminobenzoic acid, 3-methyl-4-sulfonamido-1-aminobenzene, 5-methyl-3-sulfonamido-1-aminobenzene, 3-phenyl-4-sulfonamido-1-aminobenzene, 4-(1-(3-sulfonamidophenyl)-1-methylethyl)aniline, 4-(1-(4-sulfonamido-phenyl)ethyl) aniline, 4-(4-sulfonamidophenoxy)aniline, 4-((4-sulfonamido-phenyl)thio)aniline, (4-sulfonamidophenyl)(4-aminophenyl)methanone, 4-((4-sulfon-amidophenyl) sulfonyl)aniline, 4-(1-(4-sulfonamido-3,5-dibromophenyl)-1-methylethyl)-2,6-dibromoaniline, 4-sulfonamido-1-N-methylaminobenzene, 4-amino-4'-sulfonamido-alpha-methylstilbene, 4-sulfonamido-4'-amino-alpha-methylstilbene, 2,6-dimethyl-4-sulfonamido-1-aminobenzene, and any combination thereof.

(3) An advanced active hydrogen-containing resin composition represented in Formula III, which is prepared by reacting one or more bisphenols with a stoichiometric deficiency of one or more of the epoxy resins of Formula I:

Examples of the curing agent useful in the present invention include any of the curing materials known to be useful for curing epoxy resin based compositions. Such materials include, for example, polyamine, polyamide, polyaminoamide, polyphenol, polymeric thiol, polycarboxylic acid and anhydride, polyol, and any combination thereof or the like. Other specific examples of the curing agent include dicyandiamide, phenol novolacs, bisphenol-A novolacs, phenol novolacs of dicyclopentadiene, styrene-maleic acid anhydride (SMA) copolymers; and any combination thereof. Preferred examples of the curing agent may include a phenol novolac, a cresol novolac, bisphenol A, dicyandiamide, and any combination thereof.

Dicyandiamide ("dicy") may be one preferred embodiment of the curing agent useful in the present invention. Dicy has the advantage of providing delayed curing since dicy requires relatively high temperatures for activating its curing properties; and thus, dicy can be added to a thermosetting resin and stored at room temperature (about 25° C.). Additionally, the curing profile of a resin composition using dicy may be conveniently modified using a catalyst, such as, for example, 2-methylimidazole (2-MI).

Formula III

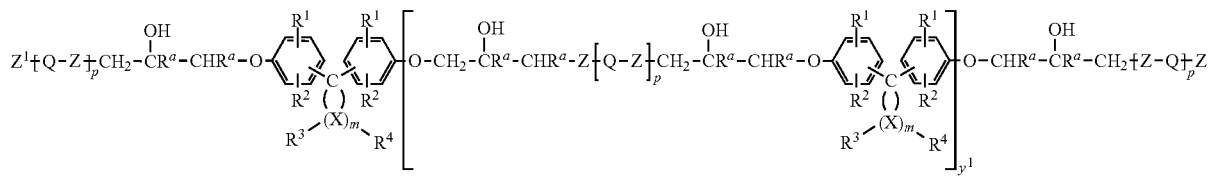

wherein $R^1$, $R^2$, $R^3$, $R^4$, $R^a$, X, Z, p, and m are as defined in Formula I, $y^1$ is an integer having a value from 0 to about 20; Q is a hydrocarbylene moiety; and $Z^1$ is Z—H.

The terms "hydrocarbylene moiety" and "hydrocarbyl moiety" are used as hereinbefore defined.

Any one of the thermoset resin compositions described above which can serve as component (I) of the thermosettable composition of the present invention, can include any of the thermoset resin compositions described in co-pending U.S. Patent Application Ser. No. 61/265,799, filed on even date herewith by Metral et al., incorporated herein by reference. The method of manufacturing component (I) is also described in the above co-pending U.S. Patent Application Ser. No. 61/265,799.

In general, the powder coating composition of the present invention may comprise a thermoset component (I), in an amount of from about 20 wt % to about 98 wt %; preferably, from about 30 wt % to about 96 wt %; and more preferably, from about 50 wt % to about 96 wt % based on the total weight of the powder coating composition.

Component (I) may be cured in accordance with well known techniques used by those skilled in the art of curing conventional thermoset resins such as epoxy resins, including for example, mixing a curing agent, component (II) with component (I) in the appropriate ratio; and subjecting the thermosettable composition comprising the mixture of components (I) and (II) to curing conditions.

The curing agent, component (II), (also referred to as a hardener or cross-linking agent) useful in the thermosettable composition, may be selected, for example, from those curing agents well known in the art including, but are not limited to, anhydrides, carboxylic acids, amine compounds, phenolic compounds, polyols, or mixtures thereof.

In general, the concentration of the curing agent or hardener, component (II), present in the thermosettable resin composition of the present invention may vary depending on the end use application. For example, the amount of curing agent used may vary from about 0.1 to about 150 parts per hundred parts thermosettable resin, by weight, in some embodiments. In other embodiments, the curing agent may be used in an amount ranging from about 5 to about 95 parts per hundred parts thermosettable resin, by weight; and the curing agent may be used in an amount ranging from about 10 to about 90 parts per hundred parts theremosettable resin, by weight, in yet other embodiments.

In another embodiment of the present invention, component (I) may be cured in accordance with well known techniques used by those skilled in the art of curing conventional epoxy resins, including for example, mixing component (I) as described above with another thermosetting resin component (III) in the appropriate ratio; and subjecting the thermosettable composition comprising the mixture of components (I) and (III) to curing conditions. In this embodiment, the curing agent or hardener (II) may be optional, particularly in the instance wherein the component (III) contains reactive functionalities that can react with the thermosetting resin without the use of a curing agent. The optional curing agent may be any of the curing agents (II) described above.

The other thermosetting resin component (III) useful for the powder coating composition, may include, for example, at least one thermoset resin component selected from epoxy resins, isocyanate resins, (meth)acrylic resins, phenolic resins, vinylic resins, styrenic resins, polyester resins, vinylester resins, silicone resins, melamine resins; and mixtures thereof. Preferably, an epoxy resin is employed as component (III) which is different from component (I) in the thermosettable resin composition.

Examples of the other thermoset resin different from component (I), suitable for use in the present invention may include epoxidized bisphenol A; epoxidized phenolic novolac, such as epoxidized phenol novolac, bisphenol A novolac, or epoxidized bisphenol dicyclopentadiene novolac; epoxidized bromine-containing bisphenol A or brominated bisphenol A novolac; epoxidized phosphorus-containing bisphenol A; or any combination thereof.

The other thermosetting resin, component (III), may be present in the thermosettable composition at a concentration ranging generally from about 0 weight percent (wt %) to about 80 wt %, preferably from about 0 wt % to about 50 wt %, and more preferably from about 0 wt % to about 40 wt %.

In one preferred embodiment, the other thermosetting resin useful as component (III), in the present invention includes at least one epoxy resin. The term "epoxy resin" herein means a compound which possesses one or more vicinal epoxy groups per molecule, i.e., at least one 1,2-epoxy group per molecule. In general, the epoxy resin compound may be a saturated or unsaturated aliphatic, cycloaliphatic, aromatic or heterocyclic compound which possesses at least one 1,2-epoxy group. Such compounds can be substituted, if desired, with one or more non-interfering substituents, such as halogen atoms, aliphatic or cycloaliphatic hydroxy groups, ether radicals, lower alkyls and the like. The epoxy resin compound may also be monomeric, oligomeric or polymeric, i.e., the epoxy resin may be selected from a monoepoxide, a diepoxide, a multi-functional epoxy resin, a polyepoxide; an advanced epoxy resin; or mixtures thereof. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins useful in the present invention may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and the triglycidyl ether of para-aminophenol. Other suitable epoxy resins known to the skilled worker include reaction products of epichlorohydrin with o-cresol and, respectively, phenol novolacs. It is also possible to use a mixture of two or more of any of the above epoxy resins.

The epoxy resins useful in the present invention for the preparation of the thermoset composition, component (III), may be selected from commercially available products. For example, D.E.R.™ 331, D.E.R.™ 332, D.E.R.™ 334, D.E.R.™ 580, D.E.N.™ 431, D.E.N.™ 438, D.E.R.™ 736, or D.E.R.™ 732 available from The Dow Chemical Company may be used. As an illustration of the present invention, the epoxy resin component of the present invention may be a liquid epoxy resin, D.E.R.™383 (DGEBPA) having an epoxide equivalent weight of 175-185, a viscosity of 9.5 Pa-s and a density of 1.16 gm./cc. Other commercial epoxy resins that can be used for the epoxy resin component can be D.E.R.™ 330, D.E.R.™ 354, or D.E.R.™ 332. D.E.R is a trademark of The Dow Chemical Company.

Other suitable epoxy resins useful in the present invention are disclosed in, for example, U.S. Pat. Nos. 3,018,262; 7,163,973, 6,887,574; 6,632,893; 6,242,083; 7,037,958; 6,572,971; 6,153,719; 5,405,688; PCT Publication WO 2006/052727; U.S. Patent Application Publication Nos. 20060293172 and 20050171237, each of which is incorporated herein by reference.

The EEW of the epoxy resins useful in the present invention is generally from about 100 g/eq to about 20,000 g/eq and more preferably from about 150 to about 5000 g/eq. As used herein the terms "epoxide equivalent weight" refers to the number average molecular weight of the epoxide moiety in grams per equivalent (g/eq) divided by the average number of epoxide groups present in the molecule. Examples of diepoxides useful in the present invention are the epoxy resins having an EEW of from about 100 g/eq to about 4000 g/eq.

Other epoxy resins useful as the at least one thermoset resin of component (III), include; an epoxidized phenol novolac; a bromine-containing epoxy resin; a phosphorous-containing epoxy resin; and combinations thereof.

More specific embodiments of the epoxy resins useful in the present invention may include for example; an epoxidized bisphenol A novolac; an epoxidized phenol dicyclopentadiene novolac; an epoxidized bromine-containing bisphenol A novolac; or any combination thereof.

In general, in one embodiment, component (III) may be present in the curable composition in an amount of from about 0 wt % to about 80 wt %; preferably, from about 0 wt % to about 60 wt %; and more preferably, from about 0 wt % to about 50 wt % based on the total weight of the composition.

The composition of the present invention optionally contains a filler. The type and amount of filler may vary depending on the type and amount of other components. The fillers used herein may include, for example, silica, talc, alumina, quartz, mica, flame retardants, metallic powders, and any combination thereof. Examples of flame retardant fillers may include aluminum trihydroxide, magnesium hydroxide, phosphinites such as aluminum or zinc phosphinites, or boehmite.

In general, the amount of filler that may be present in the thermoset resin is from about 0 percent to about 95 percent by weight, preferably, from about 2 percent to about 90 percent by weight, more preferably, from about 5 percent to about 85 percent by weight, even more preferably, from about 10 percent to about 80 percent by weight, and most preferably, from about 15 percent to about 75 percent by weight based on the total weight of the thermoset resin.

The inorganic filler is generally in a particle form and has an average particle dimension below about 1 mm, preferably below about 100 micron, more preferably below about 50 micron, and most preferably below about 10 micron, and above about 2 nm, preferably above about 10 nm, more preferably above about 20 nm, and most preferably above about 50 nm.

The thermosettable powder coating composition of the present invention may further comprise one or more optional added components such as, for example, a catalyst or a solvent.

An optional component useful in the thermosettable composition of the present invention includes at least one catalyst. The catalyst used in the present invention may be adapted for polymerization, including homopolymerization, of the at least one thermosetting resin. Alternatively, catalyst used in the present invention may be adapted for a reaction between the at least one thermosetting resin and the at least one curing agent.

The catalyst useful as an optional component in the thermosettable composition of the present invention may be any catalyst well known in the art used for this purpose. For example, the catalyst may include compounds containing amine, phosphine, heterocyclic nitrogen, ammonium, phosphonium, sulfonium moieties, a substituted derivative thereof, and any combination thereof. Some non-limiting examples of the catalyst useful in the present invention may include, for example, ethyltriphenylphosphonium chloride; benzyltrimethylammonium chloride; heterocyclic nitrogen-containing catalysts described in U.S. Pat. No. 4,925,901, incorporated herein by reference; imidazoles; triethylamine; and any combination thereof.

The selection of the catalyst useful in the present invention is not limited and commonly used catalysts for epoxy systems can be used. Also, the addition of a catalyst is optional and depends on the system prepared. When the catalyst is used, preferred examples of catalyst include tertiary amines, imidazoles, organophosphines, and acid salts.

Most preferred catalysts include tertiary amines such as, for example, triethylamine, tripropylamine, tributylamine, 2-methylimidazole, benzyldimethylamine, mixtures thereof and the like. Especially preferred are the alkyl-substituted imidazoles; 2,5-chloro-4-ethyl imidazole; and phenyl-substituted imidazoles, and any mixture thereof.

Even more preferred embodiments of the catalyst suitable for the present invention include for example 2-methyl imidazole, 2-phenyl imidazole, 1,8-diazabicyclo[5.4.0]undec-7-ene (DBU), imidazole derivatives such as 2-methyl imidazole-epoxy resin adduct, such as EPON™ P101 (available from Hexion Specialty Chemicals), and any combination thereof.

In general, the concentration of the catalyst present in the thermosettable resin composition of the present invention may vary depending on the end use application. The amount of catalyst used may vary from about 0.1 to about 20 parts per hundred parts thermosettable resin, by weight, in some embodiments. In other embodiments, catalyst may be used in an amount ranging from about 1 to about 15 parts per hundred parts thermosettable resin, by weight; and from about 2 to about 10 parts per hundred parts thermosettable resin, by weight, in yet other embodiments. The specific amount of catalyst used for a given system may be determined experimentally through simple range finding experiments to develop the optimum in properties desired.

Examples of solvents useful for the thermosettable powder coating composition of the present invention may include glycol ethers such as those commercially available as the Dowanol™ P series from the Dow Chemical Company, or ketones such as acetone or methyl ethyl ketone (MEK).

In general, the thermosettable powder coating composition of the present invention may comprise a solvent component in an amount of from about 0 wt % to about 20 wt %; preferably, from about 0 wt % to about 10 wt %; and more preferably, from about 0 wt % to about 5 wt % based on the total weight of the composition.

An optional component useful in the thermosettable composition of the present invention includes at least one chain extender. Examples of the chain extender useful as an additive in the composition of the present invention may include a dihydroxydiphenyl-cycloalkane such as bisphenol cyclododecanone, bisphenol A; dicyandiamide; a phenol novolac such as a bisphenol A novolac or phenol dicyclopentadiene novolac; bromine-containing bisphenol A such as tetrabromobisphenol A (TBBA); bromine-containing bisphenol A novolac; phosphorus-containing bisphenol A novolac; or any combination thereof.

In general, the additional optional curing agent (hardener or chain extender) used in the composition may be present in an amount of from about 0 wt % to about 50 wt %; preferably, from about 0 wt % to about 30 wt %; and more preferably, from about 0 wt % to about 20 wt % based on the total weight of the composition.

The thermosettable composition of the present invention may include optional additives and fillers conventionally found in thermosettable resin systems such as for example epoxy resin systems. The powder coating composition of the present invention may optionally contain other additives which are useful for their intended uses. For example, the additives may include stabilizers, surfactants and flow modifiers, fillers, pigments and matting agents. More specific examples of the additives useful in the present invention include $BaSO_4$, $TiO_2$, Modaflow™ Acronal 4F™, Byk 361™ (as a flow modifier), and benzoin as a degassing agent. The type and amount of the additives used in the thermosettable resin composition will depend on the intended use of the thermosettable resin composition.

For example, the optional additives useful in the present invention composition may include, but are not limited to, silica, glass, talc, metal powders, titanium dioxide, wetting agents, pigments, coloring agents, mold release agents, toughening agents, coupling agents, degassing agents, flame retardants (e.g., inorganic flame retardants, halogenated flame retardants, and non-halogenated flame retardants such as phosphorus-containing materials), ion scavengers, UV stabilizers, flexibilizing agents, tackifying agents, stabilizers, surfactants, flow modifiers, fillers, pigments or dyes, gloss control agents, antioxidants, matting agents curing initiators, curing inhibitors, thermoplastics, processing aids, UV blocking compounds, fluorescent compounds, UV stabilizers, inert fillers, fibrous reinforcements, antioxidants, impact modifiers including thermoplastic particles, and mixtures thereof. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the thermosettable resin composition. Additionally, these optional additives may have an effect on the properties of the composition, before and/or after curing, and should be taken into account when formulating the composition and the desired cured product. The above list is intended to be exemplary and not limiting. The preferred additives for the formulation of the present invention may be optimized by the skilled artisan.

Preferably, the additives used in the present invention include catalyst, co-catalysts, accelerators; and optionally other application-specific additives such as flame retardants, wetting agents, defoamers, adhesion promoters, fillers, pigments, dyes, stabilizers, UV-absorbers, and toughening agents. As is known in the art, it is possible to add other thermosetting monomers such as other epoxides, cyanates, maleimides, triazines, and benzoxazines, as well as other oligomers or polymers such as poly(phenylene oxide).

The concentration of the additional additives is generally between about 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant thermoset product; and above about 20 wt %, the property improvement(s) brought by these additives remains relatively constant.

Curable compositions may include from about 0.1 to about 50 volume percent optional additives in some embodiments.

In other embodiments, curable compositions may include from about 0.1 to about 5 volume percent optional additives; and from about 0.5 to about 2.5 volume percent optional additives in yet other embodiments.

Generally, curable compositions may be formed by admixing the above components in stages or simultaneously in the desired amounts to form the curable composition. The components of the formulation or composition of the present invention may be admixed to provide the curable composition of the present invention; and the final curable formulation of the present invention can be cured under conventional processing conditions to form a thermoset.

Any of the well known processes for manufacturing the powder coating composition may be used. For example, the components of the powder coating composition of the present invention are typically pre-blended or ground in a grinder, and the resulting ground powder mixture exiting from the grinder is then fed into an extruder.

In the extruder, the powder mixture is heated at low temperature and melted into a semi-liquid form. During this process, the components of the molten mixture are thoroughly and uniformly dispersed. Because of the fast operation of the extruder and the relatively low temperature within the extruder, the components of the powder coating composition of the present invention will not undergo a significant chemical reaction. The resulting molten extrudate of the powder coating composition of the present invention exiting from the extruder is then passed from the extruder onto a flaker which then feeds the flakes of the composition into a mill/classifier to obtain a powder coating final product with a desired particle size. The final powder coating product is then packaged in closed containers, using a packaging unit to avoid moisture ingression into the product.

The apparatus for manufacturing the powder coating composition of the present invention such as the pre-blending station or grinder; the extruder, the flaker, the mill/classifier, and the packaging unit are all well known equipment in the art.

The powder coating composition of the present invention may be applied to a substrate of an article by various methods. For example, in one embodiment, the powder coating composition may be applied to a substrate by (1) heating the substrate to a suitable curing temperature for the composition; and (2) applying the powder coating composition by known means such as an electrostatic spray or a fluidized bed. In another embodiment, the epoxy powder coating composition may be applied to a cold substrate by (1) applying the epoxy powder coating composition to the substrate (e.g. with an electrostatic application method); and (2) heating the powder and the substrate to a temperature at which the powder flows and cures.

In some embodiments, powder coatings may be formed by applying a thermosettable resin composition to a substrate and then curing the curable thermosettable resin composition.

Curing of the thermosettable resin compositions disclosed herein usually requires a temperature of at least about 30° C., up to about 250° C., for periods of minutes up to hours, depending on the thermosettable resin used, the curing agent used, and the catalyst, if used. In other embodiments, curing may occur at a temperature of at least 100° C., for periods of minutes up to hours. Post-treatments may be used as well, such post-treatments ordinarily being at temperatures between about 100° C. and 200° C.

For example, the curing reaction of the thermosettable composition may be conducted at a temperature, generally, between about 20° C. and about 250° C., preferably between about 50° C. and about 200° C., more preferably between about 50° C. and about 150° C. The time of curing the thermosettable resin composition may be for a predetermined period of time which can range from minutes up to hours, generally the reaction time is more than about 1 minute and less than about 24 hours, preferably between about 5 minutes and about 6 hours, and more preferably between about 10 hours and about 2 hours. The curing conditions of the thermosettable resin can also depend on the components used, and any optional components added to the composition such as a catalyst, if used. In other embodiments, curing may occur at a first temperature followed by a second temperature or post-treatment, such post-treatments ordinarily being at temperatures above 100° C., preferably between about 100° C. and 200° C.

Thermoset resins may be formed by curing the curable thermosettable resin compositions of the present invention as described above. The resulting thermoset resins of the present invention may comprise a thermoset or a thermoset network structure with fillers and/or other additives. The term "thermoset" or "thermoset network structure" used herein refers to a substantially cured and crosslinked thermoset resin structure.

The resulting powder coating of the present invention displays excellent thermo-mechanical properties, such as good toughness and mechanical strength, while maintaining high thermal stability.

It has been discovered in the present invention that the dihydroxydiphenyl-cycloalkane compounds of the present invention provide several improved properties to the thermoset resins of the present invention when compared to conventional phenolic curing agents and/or hardeners and/or chain extenders. For example, compared to conventional thermoset resins, the thermoset resins of the present invention comprising the dihydroxydiphenyl-cycloalkane compounds of the present invention have the following improved properties while maintaining its other properties such as high temperature stability and a high cross-linking density:

(1) an improved mechanical property such as improved toughness—based on difunctional resins with low crosslink density and therefore relatively tough;

(2) an improved thermal property such as a higher glass transition temperatures of greater than about 150° C., preferably greater than about 170° C., and more preferably greater than about 190° C. and above when cured with dicyandiamide;

(3) a higher humidity resistance property (a high moisture resistance or, in other words, a low water uptake);

(4) a lower dielectric constant/dissipation factor (Dk/Df) property; and (5) based on an epoxy resin that exhibits low viscosity of less than about 150 mPa-s and preferably less than about 120 mPa-s.

Without limiting the present invention to any one theory, it is theorized that the addition of the alkyl ring between the bisphenol groups in the dihydoxydiphenyl-cycloalkane structure may reduce the rotations of the bisphenol groups by steric hindrance and, as a result, the presence of the dihydoxydiphenyl-cycloalkane compound structure increases the glass transition temperatures (Tg) of the host resins compared to conventional resins which comprise bisphenol derivatives without the alkyl ring.

The increase of the glass transition temperatures of a host resin comprising the dihydroxydiphenyl-cycloalkane compounds of the present invention is generally in the range of from about 10° C. to about 100° C. or higher depending on factors such as type of curing agent (hardener), resin, and catalyst used in curing the resins; and the curing conditions.

The Young's moduli of a host resin comprising dihydroxy-diphenyl-cycloalkane compounds is also found to be lower compared to resins comprising bisphenol derivatives without the alkyl ring. Thus, the compositions of the present invention exhibit a higher Tg. It is theorized, that the addition of the alkyl ring between the bisphenol groups in the dihydroxy-diphenyl-cycloalkane compounds may lower the cross-linking density due to higher steric hinderance and thus, provides improved toughness to thermosettable resins such as epoxy resins.

EXAMPLES

The following examples and comparative examples further illustrate the present invention in detail but are not to be construed to limit the scope thereof.

Various terms and designations used in the following examples are explained herein as follows: D.E.R.™ 330 is a diglycidyl ether of bisphenol A having an epoxy equivalent weight (EEW) between 177 g/eq and 189 g/eq, available from The Dow Chemical Company; Dowanol™ PM is a solvent containing propylene glycol methyl ether, supplied by The Dow Chemical Company; Plenco 13943 is a phenol novolac epoxy resin, available from Plastics Engineering Co.; "A1 catalyst" is a catalyst solution of ethyltriphenylphosphonium acid acetate in methanol available from Alfa Aesar; EPON™ P101 is a catalyst available from Hexion Chemical; "dicy" stands for dicyandiamide; "DSC" stands for Differential Scanning calorimetry; "EEW" stands for epoxy equivalent weight; "HEW" stands for hydroxyl equivalent weight; "2-MI" stands for 2-methyl-imidazole; XZ92747 is bisphenol A novolac hardener having a bisphenol A content about 21% by weight, commercially available as KBE F4113 from Kolon Chemical (from Korea); XZ92755 is a bisphenol A novolac hardener based on KBE F4127 has lower bisphenol A content about 17% by weight, commercially available from Kolon Chemical (from Korea); and Herinol KBE F4127 is a bisphenol A novolac hardener based on KBE F4127 has lower bisphenol A content about 17% by weight, commercially available from Kolon Chemical (from Korea).

The following standard analytical equipments and methods are used in the Examples:

Epoxy equivalent weight (EEW) was measured by a colorimetric titration of epoxy resin samples (about 0.4 mg) with 0.1 M perchloric acid in the presence of tetraethylammonium bromide in glacial acetic acid. Crystal violet was employed as indicator according to ASTM D 1652 method.

The glass transition temperature (Tg) was measured by Differential Scanning calorimetry (DSC) from 50° C. to 220° C. with a heating ramp of 20° C./minute.

Mechanical properties as a function of temperature were measured using Dynamic Mechanical Analysis (DMA).

The reactivity of a resin solution was measured by placing a sample of the resin solution on the surface of a hot plate at 170° C. The reactivity measurement of the resin solution is reported as elapsed time in second required for gelation ("gel time") at 170° C.

The softening point was determinate with a Mettler FP80 with a heating ramp of 3° C./minute from room temperature (about 25° C.) to 200° C.

Thermo-gravimetric Analysis (TGA) was used to measure the decomposition temperature Td. TGA was performed by using a thermo-gravimetric analyzer TGA2950 from TA Instruments which is fitted with an auto-sampling device and connected to a personal computer. TGA analyzer was operated under nitrogen atmosphere. The decomposition temperature Td was measured according to IPC-TM-650-2.3.40 with from 50° C. to 700° C. with a heating ramp of 10° C./minute. Td was determined at percent weight loss (except otherwise mentioned, i.e. 1%, 2%, 5%, or 10% weight loss). The typical experimental error was ±1° C.

Example 1

Advancement Reaction of Bisphenol Cyclododecanone with D.E.R.™ 330

A 66.8 gram (g) sample of bisphenol cyclododecanone (189.8 mmol) was dissolved in 133.1 g of D.E.R.™ 330 (371.8 mmol) in a 500 ml glass reactor at 140° C. to form a solution. The solution was cooled to 80° C. and then 100 milligrams (mg) of an A1 catalyst solution (70% solids in methanol) was added to the mixture to start the reaction of the bisphenol cyclododecanone with D.E.R. 330. The advancement reaction was carried out at 150° C. to form Advanced Resin A. After 1 hour, the Advanced Resin A was characterized by titration. The EEW of the Advanced Resin A obtained from the titration was 520 g/eq ($EEW_{theory}$=551 g/eq). The Tg of the Advanced Resin A was measured by DSC with a heating ramp of 10° C./minute. The Tg was 54° C.

Comparative Example A

A 52.5 g sample of bisphenol A (230.3 mmol) was dissolved in 147.4 g of D.E.R.™ 330 (411.7 mmol) in a 500 ml glass reactor at 140° C. The mixture was cooled to 80° C. and then 100 mg of an A1 catalyst solution (70% solids in methanol) was added to the mixture to start the advancement reaction of bisphenol A with D.E.R. 330. The reaction was carried out at 150° C. to form Comparative Advanced Resin A. After 1 hour, the Comparative Advanced Resin A was characterized by titration. The EEW of the Comparative Advanced Resin A obtained from the titration was 569 g/eq ($EEW_{theory}$=552 g/eq). The Tg of the Comparative Advanced Resin A was measured by DSC with a heating ramp of 10° C./minute. The Tg was 49° C.

The advanced bisphenol cyclododecanone resin (Example 1) has higher resin Tg than the advanced bisphenol A resin (Comparative Example A). A higher Tg for a resin can be beneficial to the resin's storage stability.

Example 2

Curing the Advanced Resin of Bisphenol Cyclododecanone and D.E.R.™ 330

A 20.0 g sample of the Advanced Resin A (EEW=520 g/eq) obtained from Example 1 above was mixed with 0.48 g of dicy and 0.25 g of EPON™ P101. The mixture was cured for 2 hours at 200° C. to form Cured Resin A. The Tg of the Cured Resin A was measured by DSC with a heating ramp of 10° C./minute. The Tg of Cured Resin A was 141° C.

Comparative Example B 20.0 g of the Advanced Resin B (EEW=569 g/eq) obtained from Comparative Example A above was mixed with 0.45 g of dicy (equivalent wt 14 g/eq) and 0.26 g of EPON P101.

The mixture was cured for 2 hours at 200° C. to form Cured Resin B. The Tg of Cured Resin B was measured by DSC with a heating ramp of 10° C./minute. The Tg of Cured Resin B was 115° C.

The cured resins of Example 2 and Comparative Example B show the Tg's for Cured Resin A (advanced bisphenol cyclododecanone resin, Example 2) and Cured Resin B (advanced bisphenol A resin, Comparative Example B) with a similar EEW. The use of the bisphenol cyclododecanone illustrates that Cured Resin A has an increased Tg over Cured Resin B of 26° C.

Example 3

Curing the Diglycidyl Ether of Bisphenol Cyclododecanone with a Phenol Novolac

A mixture of the diglycidyl ether of bisphenol cyclododecanone (15.0 g) and a phenol novolac (5.3 g, Plenco 13943™) was mixed to insure homogeneity and melted together at 160° C. After cooling the mixture to 80° C., a solution of 2-MI (20% w/w in Dowanol™ PM, 50 mg) was added. The mixture was poured into an aluminum pan (60 mm diameter) and heated to 200° C. for 2 hours to cure. Samples for DMA analysis with dimensions 11×55×3 mm were machined from this casting. The DMA results are discussed below.

Comparative Example C

A mixture of the D.E.R.™ 330 (15.0 g) and a phenol novolac (8.38 g, Plenco 13943™) was melted together at 160° C. After cooling the mixture to 80° C., a solution of 2-MI (20% w/w in Dowanol™ PM, 50 mg) was added. The mixture was poured into an aluminum pan (60 mm diameter) and heated to 200° C. for 2 hours to cure. Samples for DMA analysis with dimensions 11×55×3 mm were machined from this casting. The DMA results are discussed below.

The toughness of two resins (Resin C and Comparative Resin C) was measured by DMA. The cured resin of Example 2 which comprises Resin C is an advanced bisphenol cyclododecanone resin prepared using the procedure in Example 1. Resin C was cured with Plenco 13943 using the procedure in Example 2. The cured resin is referred to herein as "Cured Resin C" (Example 3).

Comparative Resin C is a conventional bisphenol A, DER 330. Comparative Resin C was cured with Plenco 13943 [herein "Comparative Cured Resin C" (Comparative Example C)] using the procedure of Comparative Example B.

Cured Resin C and Comparative Cured Resin C have similar glass transition temperature (Tg) at about 130° C. The toughness of the above two resins can be compared because the resins have similar glass transition temperatures (Tg).

Toughness may be defined by a drop in Young's modulus (E'). The two resins get less stiff (modulus decreases) as a result of the glass transition at about 130° C. The Young's modulus (E') of Cured Resin C decreases from about $5 \times 10^9$ Pa before the Tg at 130° C. to about $3 \times 10^7$ Pa after the Tg at 130° C.

The Young's modulus (E') of Cured Resin C in the rubber modulus range (after Tg reaches 130° C.) has a lower Young's modulus (E') (improved toughness) than that of Comparative Cured Resin C in the same rubber modulus range. Accordingly, Cured Resin C has an improved toughness by using bisphenol cyclododecanone over Comparative Cured Resin C which uses a conventional bisphenol A.

The results of Examples of the present invention show that an epoxy resin comprising a diglycidyl ether of a dihydroxy-diphenyl-cycloalkane compound has a higher resin glass transition temperature (resin Tg) than a conventional epoxy resin such as those based on bisphenol A (see Example 1 and Comparative Example A). The cured epoxy resin of the present invention shows a higher cured glass transition temperature (cured Tg) than an epoxy resin comprising a conventional epoxy resin based on bisphenol A (see Example 2 and Comparative Example B). The cured epoxy resin of the present invention also has improved mechanical properties such as toughness compared to a conventional epoxy resin cured by phenolic hardeners; and therefore, the epoxy resin of the present invention has improved resistance to impact (see Example 3 and Comparative Example C).

Example 4

Synthesis of eCDON

A two liter, three necks, round bottom glass reactor equipped with a thermostatically controlled heating mantle was charged with the bisphenol of cyclododecanone (~176 g, 1.0 hydroxyl eq), epichlorohydrin (~694 g, 7.5 moles) and isopropanol (~373 g, 35% weight of the epichlorohydrin used). The reactor was additionally equipped with a condenser (maintained at −15° C.), a thermometer, a Claisen adaptor, an overhead nitrogen inlet (1 LPM $N_2$ used), and a stirrer assembly (Teflon™ paddle, glass shaft, variable speed motor). After dissolving at 50° C., a solution of sodium hydroxide (20% in water, 180 g) was added to a side arm vented addition funnel over 20-30 minutes. Stirring commenced to give slurry of the bisphenol of cyclododecanone in epichlorohydrin and isopropanol. The temperature was maintained at 50° C. during the reaction. After 20 minutes of postreaction, stirring was stopped and the aqueous layer was removed from the organic layer.

Heating and stirring of the organic layer was resumed to 50° C. Dropwise addition of a second portion of sodium hydroxide (20% in water, 80 g) to the organic layer was completed over 20 minutes while maintaining the temperature at 50° C. After 20 minutes of postreaction stirring was stopped, and the aqueous layer was removed from the organic layer product. Then the organic layer was washed with 3-4 portions (250 milliliters each) of deionized water until a pH of 7 of the organic layer was achieved.

Rotary evaporation of the organic layer using an oil bath temperature of 75° C. was used to remove the bulk of the volatiles. Further rotary evaporation at 125° C. for 2-3 hour (16 mbar) gave ~225-235 g of transparent, colorless liquid which solidified to a brittle solid at room temperature (~25° C.). The resulting resin was the diglycidyl ether of bisphenol cyclododecanone (herein "eCDON") and had the following properties:

| Example 4 Resin | Tg (° C.)[1] | Softening Point (° C.)[2] | Melt viscosity at 150° C. (mPa · s) | EEW measured by titration (g/eq) |
|---|---|---|---|---|
| eCDON | 31 | 74.6 | 120 | 236 |

[1]From −20° C. to 150° C. with 10° C./minute
[2]At 2° C./minute

Example 5

Preparation of a Powder Composition Using eCDON

A 20 g sample of the eCDON (EEW 236 g/eq) prepared in Example 4 above, 1.06 g dicy (equiv. wt. 14 g/mol) and 0.35 g EPON™ P101 were mixed 10 seconds at 15° C. to a fine powder. The powder was than cured for 30 minutes at 200° C. The glass transition temperature (Tg) of the resulting thermoset was recorded from 50° C. to 300° C. with a heat ramp of 10° C./minute. The Tg of the resulting thermoset was about 198° C.

Comparative Example E

Preparation of a Powder Composition Using a Conventional Epoxy Resin

A 20 g sample of an epoxy resin D.E.R.™ 330 (EEW 179 g/eq) (a diglycidyl ether of bisphenol A material, commercially available from The Dow Chemical Company), 1.4 g dicy (equiv. wt. 14 g/eq) and 0.35 g EPON™ P101 were mixed at 120° C. and 20 minutes at 180° C. The resulting product was mixed 10 seconds at 150° C. to a fine powder which was than cured for 30 minutes at 200° C. The Tg of the resulting product was recorded from 50° C. to 300° C. with a heat ramp of 10° C./minute. The Tg of the resulting thermoset was about 143° C.

As shown in the above Example 5 and Comparative Example E, the use of the advanced diglycidyl ether of bisphenol cyclododecanone (Example 1) as compared to the use of the diglycidyl ether of bisphenol A material (Comparative Example E) resulted in a thermoset product with a Tg of 198° C. versus 143° C., respectively. The use of the diglycidyl ether of bisphenol cyclododecanone increased the Tg of the resulting thermoset product by 55° C.

Example 6

Cure of eCDON with Dicy

A sample of eCDON (4.62 g), dicy (0.34 g), and 2-phenylimidazole (0.038 g) was mixed by cryogrinding. This procedure involves adding the solids to a stainless steel cylinder with threaded ends, adding a metal ball, cooling the contents in liquid nitrogen, and shaking the assembly for 10 minutes. The cylinder was placed in a nitrogen-purged bag and allowed to warm to room temperature. A portion of the powder was placed in an aluminum pan, and heated in a vacuum oven at 190° C. for 90 minutes to form a clear casting. A Tg of 202° C. was observed by DSC. This casting was cut into 4 pieces, each was weighed, and all were placed in a steam autoclave at 121° C. for 90 minutes. The weight gain of each piece was expressed as a percentage, and the 4 values were averaged to give a value of 2.3 wt %.

Comparative Example F

Cure of D.E.R.™ 331 with Dicy

The experiment described in Example 6 was repeated using D.E.R.™ 331 (bisphenol A diglycidyl ether, 4.51 g), dicy (0.44 g), and 2-phenylimidazole (0.05 g). A Tg of 139° C. was observed by DSC, and the water absorption was 3.9 wt %.

As shown in the above Example 6 and Comparative Example F, the use of the diglycidyl ether of bisphenol cyclododecanone (Example 6) as compared to the use of the diglycidyl ether of bisphenol A material (Comparative Example F) resulted in a thermoset product with a Tg 202° C. versus 139° C., respectively and water absorption of 2.3 wt % versus 3.9 wt %, respectively. The use of the diglycidyl ether of bisphenol cyclododecanone increased the Tg of the resulting thermoset product by 63° C. and reduced water absorption by 41%.

The invention claimed is:

1. A process for forming a curable powder coating resin comprising:
   admixing (I) at least one thermoset resin composition; and (II) at least one hardener, wherein the thermoset resin composition comprises an epoxy resin represented by the following general Formula I:

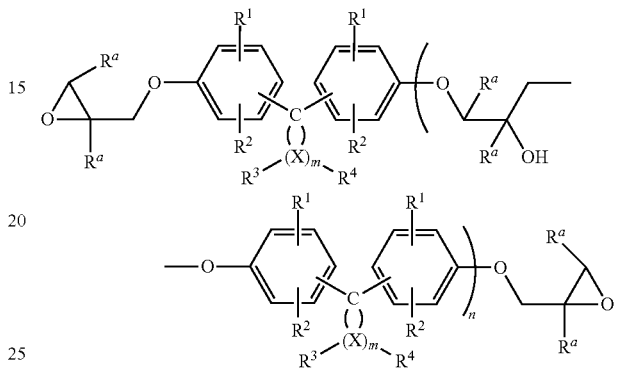

Formula I $R^a$ is a hydrogen or methyl group; $R^1$ and $R^2$, independently from each other, each represents a hydrogen atom, a halogen, a substituted or unsubstituted alkyl group, a substituted or unsubstituted aryl group, or a substituted or unsubstituted aralkyl group; a nitrile group; a nitro group; a substituted or unsubstituted alkoxy group; X is a carbon atom; m is an integral number between 11 and 20; $R^3$ and $R^4$, independently from each other, each represents a hydrogen atom, a halogen, a substituted or unsubstituted alkyl group, a substituted or unsubstituted aryl group, or a substituted or unsubstituted aralkyl group; and n is an integer having a value from 1 to 10.

2. The process of claim 1, wherein the admixing comprises grinding to form a ground mixture.

3. The process of claim 2, further including extruding the ground mixture to form an extrudate.

4. The process of claim 3, further including flaking the extrudate.

5. The process of claim 1, further including admixing an additional thermosetting resin component (III) selected from epoxy resins, isocyanate resins, (meth)acrylic resins, phenolic resins, vinylic resins, styrenic resins, polyester resins, and mixtures thereof with the (I) at least one thermoset resin composition and the (II) at least one hardener.

6. The process of claim 5, wherein the additional thermosetting resin (III) comprises an epoxy resin.

7. The process of claim 1, wherein the admixing includes the (I) at least one thermoset resin composition from about 10 percent by weight to about 99 percent by weight of the total weight of the components.

8. The process of claim 1, further including admixing at least one of: (V) a catalyst; and (VI) a solvent.

9. The process of claim 1, wherein the (I) at least one thermoset resin composition comprises a diglycidyl ether of a dihydroxydiphenyl-cycloalkane compound; and wherein the dihydroxydiphenyl-cycloalkane compound comprises a dihydroxydiphenyl-cycloalkane compound represented by the following general Formula IV:

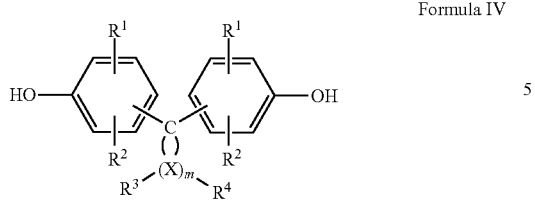

Formula IV wherein $R^1$ and $R^2$, independently from each other, each represents a hydrogen atom, a halogen, a substituted or unsubstituted alkyl group, a substituted or unsubstituted aryl group, or a substituted or unsubstituted aralkyl group; X is a carbon atom; m is an integral number between 11 and 20; and $R^3$ and $R^4$, independently from each other, each represents a hydrogen atom, a halogen, a substituted or unsubstituted alkyl group, a substituted or unsubstituted aryl group, or a substituted or unsubstituted aralkyl group.

10. The process of claim 9, wherein the dihydroxydiphenyl-cycloalkane compound is made from a compound that comprises cyclododecanone, cyclopentadecanone, cyclooctadecanone, cycloeicosanone, and mixtures thereof.

11. The process of claim 1, wherein the (I) at least one thermoset resin composition is advanced with bisphenol cyclododecanone.

12. The process of claim 1, wherein the (I) at least one thermoset resin composition comprises from about 20 percent by weight to about 98 percent by weight based on total weight of the composition; and wherein component (II) comprises from about 2 percent by weight to about 50 percent by weight based on total weight of the composition.

* * * * *